US007000594B2

(12) United States Patent
Arakawa et al.

(10) Patent No.: US 7,000,594 B2
(45) Date of Patent: Feb. 21, 2006

(54) ELECTRONIC CONTROL UNIT FOR TWO-CYCLE INTERNAL COMBUSTION ENGINE WITH EXHAUST CONTROL VALVE

(75) Inventors: Yoshinobu Arakawa, Numazu (JP); Kouji Sasaki, Numazu (JP); Yoshikazu Tsukada, Numazu (JP); Mitsugu Koike, Numazu (JP)

(73) Assignee: Kokusan Denki Co., Ltd., Shizuoka-Ken (JP)

( * ) Notice: Subject to any disclaimer, the term of this patent is extended or adjusted under 35 U.S.C. 154(b) by 0 days.

(21) Appl. No.: 10/331,864

(22) Filed: Dec. 30, 2002

(65) Prior Publication Data

US 2003/0164155 A1    Sep. 4, 2003

(30) Foreign Application Priority Data

Mar. 1, 2002    (JP) .............................. 2002-056473

(51) Int. Cl.
*F02P 5/00*    (2006.01)
*F02B 25/20*    (2006.01)
*F02B 27/06*    (2006.01)
*F02D 9/04*    (2006.01)

(52) U.S. Cl. .......................... 123/406.13; 123/406.47; 123/479; 123/65 PE

(58) Field of Classification Search .............. 123/73 A, 123/73 C, 73 B, 65 PE, 65 P, 65 V, 406.13, 123/406.47, 479, 198 D, 198 DB, 198 DC
See application file for complete search history.

(56) References Cited

U.S. PATENT DOCUMENTS

| 5,697,332 | A  | * | 12/1997 | Asai et al. ............... | 123/65 PE |
| 5,769,041 | A  | * | 6/1998 | Suzuki et al. ............. | 123/73 C |
| 6,039,013 | A  | * | 3/2000 | Motose .................... | 123/65 PE |
| 6,481,394 | B1 | * | 11/2002 | Hiki ....................... | 123/65 PE |
| 6,647,933 | B1 | * | 11/2003 | Tsukada et al. ........... | 123/41 E |

FOREIGN PATENT DOCUMENTS

| JP | 92562 | * | 4/1991 |
| JP | 37768 | * | 2/1998 |
| JP | 132045 | * | 5/1999 |
| JP | 2002-195073 | | 10/2002 |

* cited by examiner

*Primary Examiner*—Hai Huynh
(74) *Attorney, Agent, or Firm*—Pearne & Gordon LLP

(57) ABSTRACT

An electronic control unit for controlling a fuel injection amount of a two-cycle internal combustion engine with an exhaust control valve wherein the electronic control unit comprises an injection amount determination means for determining the fuel injection amount at various control conditions, a valve abnormality detection means for detecting an abnormality of operation of the exhaust control valve, and an injector driving means for driving an injector so as to inject fuel of the amount determined by the injection amount determination means from the injector. The injection amount determination means determines the injection amount so that when the valve abnormality detection means detects the abnormality of operation of the exhaust control valve, an air-fuel mixture is made in a rich state.

25 Claims, 10 Drawing Sheets

| THROTTLE OPENING DEGREE (ANGLE) | | ROTATIONAL SPEED(rpm) | | | | | |
|---|---|---|---|---|---|---|---|
| | | 500 | 1000 | 1500 | ... | 8500 | 9000 |
| | 2 | | | | | | |
| | 5 | | | | | | |
| | 10 | | | | | | |
| | : | | | IGNITION TIMING DATA | | | |
| | : | | | | | | |
| | 70 | | | | | | |
| | 80 | | | | | | |
| | 90 | | | | | | |

IGNITION TIMING ARITHMETICAL OPERATION MAP
FOR FULLY-OPENED POSITION

| THROTTLE OPENING DEGREE (ANGLE) | | ROTATIONAL SPEED(rpm) | | | | | |
|---|---|---|---|---|---|---|---|
| | | 500 | 1000 | 1500 | ... | 8500 | 9000 |
| | 2 | | | | | | |
| | 5 | | | | | | |
| | 10 | | | | | | |
| | : | | | IGNITION TIMING DATA | | | |
| | : | | | | | | |
| | 70 | | | | | | |
| | 80 | | | | | | |
| | 90 | | | | | | |

IGNITION TIMING ARITHMETICAL OPERATION MAP
FOR FULLY-CLOSED POSITION

| THROTTLE OPENING DEGREE (ANGLE) | ROTATIONAL SPEED(rpm) | | | | | |
|---|---|---|---|---|---|---|
| | | 500 | 1000 | 1500 | ··· | 8500 | 9000 |
| | 2 | | | | | | |
| | 5 | | | | | | |
| | 10 | | | | | | |
| | : | | INJECTION TIME DATA | | | |
| | : | | | | | | |
| | 70 | | | | | | |
| | 80 | | | | | | |
| | 90 | | | | | | |

INJECTION AMOUNT DETERMINING VARIABLE ARITHMETICAL OPERATION MAP FOR FULLY-OPENED POSITION

| THROTTLE OPENING DEGREE (ANGLE) | ROTATIONAL SPEED(rpm) | | | | | |
|---|---|---|---|---|---|---|
| | | 500 | 1000 | 1500 | ··· | 8500 | 9000 |
| | 2 | | | | | | |
| | 5 | | | | | | |
| | 10 | | | | | | |
| | : | | INJECTION TIME DATA | | | |
| | : | | | | | | |
| | 70 | | | | | | |
| | 80 | | | | | | |
| | 90 | | | | | | |

INJECTION AMOUNT DETERMINING VARIABLE ARITHMETICAL OPERATION MAP FOR FULLY-CLOSED POSITION

Fig.8A

Mfn

| THROTTLE OPENING DEGREE (ANGLE) | | ROTATIONAL SPEED(rpm) | | | | | |
|---|---|---|---|---|---|---|---|
| | | 500 | 1000 | 1500 | ... | 8500 | 9000 |
| | 2 | | | | | | |
| | 5 | | | | | | |
| | 10 | | INJECTION TIME DATA AT NORMAL STATE OF EXHAUST CONTROL VALVE | | | | | |
| | : | | | | | | |
| | : | | | | | | |
| | 70 | | | | | | |
| | 80 | | | | | | |
| | 90 | | | | | | |

INJECTION AMOUNT DETERMNING VARIABLE
ARITHMETICAL OPERATION MAP FOR NORMAL STATE

Fig.8B

Mfa

| THROTTLE OPENING DEGREE (ANGLE) | | ROTATIONAL SPEED(rpm) | | | | | |
|---|---|---|---|---|---|---|---|
| | | 500 | 1000 | 1500 | ... | 8500 | 9000 |
| | 2 | | | | | | |
| | 5 | | | | | | |
| | 10 | | INJECTION TIME DATA AT ABNORMAL STATE OF EXHAUST CONTROL VALVE | | | | | |
| | : | | | | | | |
| | : | | | | | | |
| | 70 | | | | | | |
| | 80 | | | | | | |
| | 90 | | | | | | |

INJECTION AMOUNT DETERMNING VARIABLE
ARITHMETICAL OPERATION MAP FOR ABNORMAL STATE

| THROTTLE OPENING DEGREE (ANGLE) | | ROTATIONAL SPEED(rpm) | | | | | |
|---|---|---|---|---|---|---|---|
| | | 500 | 1000 | 1500 | ... | 8500 | 9000 |
| | 2 | | | | | | |
| | 5 | | | | | | |
| | 10 | INJECTION TIME CORRECTION DATA AT ABNORMAL STATE OF EXHAUST CONTROL VALVE | | | | | |
| | : | | | | | | |
| | : | | | | | | |
| | 70 | | | | | | |
| | 80 | | | | | | |
| | 90 | | | | | | |

| THROTTLE OPENING DEGREE (ANGLE) | | ROTATIONAL SPEED(rpm) | | | | | |
|---|---|---|---|---|---|---|---|
| | | 500 | 1000 | 1500 | ... | 8500 | 9000 |
| | 2 | | | | | | |
| | 5 | | | | | | |
| | 10 | IGNITION TIMING CORRECTION DATA AT ABNORMAL STATE OF EXHAUST CONTROL VALVE | | | | | |
| | : | | | | | | |
| | : | | | | | | |
| | 70 | | | | | | |
| | 80 | | | | | | |
| | 90 | | | | | | |

Fig.10A

| Mf | | ROTATIONAL SPEED(rpm) | | | | | |
|---|---|---|---|---|---|---|---|
| | | 500 | 1000 | 1500 | ... | 8500 | 9000 |
| INTAKE PIPE PRESSURE (mmHg) (DIFFERENTIAL PRESSURE) | 2 | | | | | | |
| | 5 | | | | | | |
| | 10 | | | | | | |
| | : | | INJECTION TIME DATA | | | | |
| | : | | | | | | |
| | 70 | | | | | | |
| | 80 | | | | | | |
| | 90 | | | | | | |

Fig.10B

| Mi | | ROTATIONAL SPEED(rpm) | | | | | |
|---|---|---|---|---|---|---|---|
| | | 500 | 1000 | 1500 | ... | 8500 | 9000 |
| INTAKE PIPE PRESSURE (mmHg) (DIFFERENTIAL PRESSURE) | 2 | | | | | | |
| | 5 | | | | | | |
| | 10 | | | | | | |
| | : | | IGNITION TIMING DATA | | | | |
| | : | | | | | | |
| | 70 | | | | | | |
| | 80 | | | | | | |
| | 90 | | | | | | |

ELECTRONIC CONTROL UNIT FOR TWO-CYCLE INTERNAL COMBUSTION ENGINE WITH EXHAUST CONTROL VALVE

TECHNICAL FIELD OF THE INVENTION

The present invention relates to an electronic control unit for a two-cycle internal combustion engine provided with an exhaust control valve for adjusting exhaust timing.

BACKGROUND OF THE INVENTION

In a two-cycle internal combustion engine, an intake air amount is increased by utilizing the pulsation of exhaust and hence the charging efficiency is increased, by which an output of the engine can be improved. Therefore, in a two-cycle internal combustion engine required to improve the output, an exhaust control valve for opening/closing an upper part of an exhaust port and exhaust control valve control means for controlling the exhaust control valve according to the rotational speed of the engine are provided so that the opening degree of the exhaust control valve is adjusted to obtain an exhaust pulsation effect in the range from low-speed region to high-speed region of the engine.

As a control unit for the exhaust control valve, there are available a unit in which an electric actuator for operating the exhaust control valve and a sensor for detecting the opening degree of the exhaust control valve are provided to control the actuator so that the valve opening degree detected by the sensor coincides with a desired opening degree, and a unit in which force relationships between tension of a spring for urging the exhaust control valve to the closing side and the exhaust pressure of the engine is utilized so that the opening degree of the exhaust control valve is subjected mechanically to automatic control according to the change in the rotational speed of the engine.

Generally speaking, when the opening degree of the exhaust control valve is increased and the upper part of the exhaust port is opened, a large exhaust pulsation effect is achieved in a high-speed rotation region, so that the charging efficiency can be enhanced, by which the output of the engine can be improved.

Also, when the opening degree of the exhaust control valve is decreased and the upper part of the exhaust port is closed, a large exhaust pulsation effect is achieved in a low-speed rotation region, so that the charging efficiency of the engine can be enhanced, by which the output of the engine in the low-speed region can be improved.

In a conventional two-cycle internal combustion engine using a carburetor as fuel supply means, when the intake air amount is changed by the exhaust pulsation effect, the amount of fuel is automatically controlled, and the air-fuel ratio of air-fuel mixture is kept in a predetermined range. Therefore, the carburetor need not be controlled according to the change in intake air amount.

On the other hand, in a two-cycle internal combustion engine using an electronic fuel injection control unit, the intake air amount is estimated from an opening degree of a throttle and rotational speed of the engine or is estimated from the pressure in an intake pipe and the rotational speed, and a fuel injection amount necessary for obtaining a mixture with a predetermined air-fuel ratio is arithmetically operated based on the estimated intake air amount. Therefore, measures cannot be taken against the change in intake air amount caused by the change in the opening degree of the exhaust control valve, so that the fuel injection amount cannot be controlled properly depending on the change in intake air amount caused by the control of the exhaust control valve.

When the intake air amount is increased by the change in the opening degree of the exhaust control valve, if the fuel injection amount is not changed, the air-fuel ratio changes to the lean side, and the mixture becomes lean, which causes the engine to seize.

Inversely, when the intake air amount is decreased, if the fuel injection time is not changed, the air-fuel ratio changes to the rich side, and the mixture becomes rich, which decreases the output of the engine, deteriorates components of exhaust, and increases fuel consumption.

Also, when the intake air amount is changed by the control of the exhaust control valve and hence the amount of fuel required by the internal combustion engine is changed, the optimal ignition timing of the engine changes naturally. When the fuel amount required by the engine is changed, if the ignition timing deviates from the timing adapted to the fuel amount, the operation of the engine becomes unstable and the output thereof is decreased. Therefore, when the exhaust control valve is controlled, the ignition timing must also be controlled.

Thereupon, the applicants proposed previously, in Japanese Patent Application Laid-Open Publication No. 2002-195073, a control unit for a two-cycle internal combustion engine in which, by controlling the fuel injection amount and the ignition timing according to the opening degree of the exhaust control valve, even when the intake air amount is changed by the change in opening degree of the exhaust control valve, the air-fuel ratio of the mixture and the ignition timing of the engine can be kept in a proper range.

In the already-proposed control unit, fuel injection amount arithmetical operation maps and ignition timing arithmetical operation maps are prepared beforehand for a plurality of openings of the exhaust control valve, and the fuel injection amount and ignition timing are determined by interpolation by using the fuel injection amount arithmetical operation map and the ignition timing arithmetical operation map selected according to the opening degree of the exhaust control valve. Thereby, the fuel injection amount and ignition timing are kept in a proper range with respect to the change in the opening degree of the exhaust control valve.

According to the already-proposed control unit, when the intake air amount is changed by the control of the exhaust control valve, the air-fuel ratio of the mixture can be kept in a proper range by changing the fuel injection amount. Therefore, phenomena that, when the intake air amount is decreased by the change in the opening degree of the exhaust control valve, the mixture becomes rich, which decreases the output and deteriorates the components of the exhaust gas and that, when the intake air amount is increased, the mixture becomes lean, which causes the engine to seize can be prevented.

However, in the already-proposed control unit, measures have not been taken against abnormality of operation of the exhaust control valve.

The abnormality of operation of the exhaust control valve occurs when trouble is caused in a control system of the exhaust control valve or when trouble is caused in the exhaust control valve itself. The trouble of the control system of the exhaust control valve includes, for example, a failure of a sensor for detecting the opening degree of the exhaust control valve, a failure of a power source for the sensor, breakage of a signal line for transmitting the output of the sensor to a control circuit, and a failure of an actuator for operating the exhaust control valve. Also, when the exhaust control valve becomes difficult to move due to carbon and the like adhering to a movable portion of the valve, the operation of the exhaust control valve itself becomes abnormal.

Even when means for controlling the fuel injection amount or for controlling the ignition timing according to the change in the opening degree of the exhaust control valve is provided as in the case of the already-proposed control unit, in the event when the operation of the exhaust control valve becomes abnormal, the arithmetically operated fuel injection amount and the intake air amount become unmatched, so that an anticipated object cannot be attained.

In particular, when the abnormality of operation of the exhaust control valve occurs, the control of the fuel injection amount is not carried out properly and the mixture becomes lean, so that the engine may seize and be damaged. If the mixture becomes lean and the engine seizes, the engine cannot be operated further. Therefore, the operation of the vehicle and the like driven by the internal combustion engine cannot be continued, and thus the vehicle and the like must inevitably be left at the site. In particular, when an outboard motor stops on the sea, or when a snowmobile becomes in a stopped state on a snow-covered mountain, the driver may meet with a disaster. Therefore, a state in which the operation of the engine cannot be continued must be prevented to the utmost.

SUMMARY OF THE INVENTION

An object of the present invention is to provide an electronic control unit for a two-cycle internal combustion engine with an exhaust control valve, in which a fuel injection timing or an ignition timing is controlled according to change in an opening degree of the exhaust control valve, so that when operation of the exhaust control valve becomes abnormal, an air-fuel mixture is prevented from becoming lean, and thus the engine is prevented from becoming seized and being damaged.

The present invention is applied to an electronic control unit for a two-cycle internal combustion engine with an exhaust control valve, which includes an injector for supplying fuel to the two-cycle internal combustion engine provided with the exhaust control valve whose opening is changed to control an exhaust timing, injection amount determination means for determining, for various control conditions, an injection amount determining variable for determining the injection amount of fuel injected from the injector, injector driving means for driving the injector so as to inject fuel of the injection amount determined by the injection amount determining variable determined by the injection amount determination means, ignition timing determination means for determining the ignition timing of the internal combustion engine for various control conditions, and ignition device driving means for driving an ignition device which ignites the internal combustion engine and performing an igniting operation when the ignition timing determined by the ignition timing determination means is detected.

Herein, the "injection amount determining variable" is an amount capable of being used to determine the amount of fuel injected from the injector. The injection amount determining variable may be the fuel injection amount itself, or the fuel injection time or the like.

In a generally used fuel injection system, a pressure of fuel supplied from a fuel tank to the injector by a fuel pump is kept constant by a pressure regulator, so that the fuel injection amount is managed by the time for which fuel is injected from the injector (injection time). In this case, the injector driving means drives the injector so that fuel is injected for the determined injection time. Therefore, the injection time is preferably used as the injection amount determining variable.

Even in the case where the fuel injection amount is determined by the fuel injection time, the injection amount determination means may be comprised so that the injection amount itself is arithmetically operated as the injection amount determining variable. In this case, however, it is necessary to add means for arithmetically operating the injection time necessary for further obtaining the injection amount from the arithmetically operated injection amount.

In the present invention, valve abnormality detection means is provided to detect the abnormality of operation of the exhaust control valve. The injection amount determination means is comprised so that when the valve abnormality detection means detects the abnormality of operation of the exhaust control valve, the fuel injection amount takes a value higher than the value determined by the control condition at the normal state.

By this configuration, the fuel injection amount is increased and the air-fuel ratio of the mixture is changed to the rich side when the operation of the exhaust control valve is abnormal and a state in which the injection amount arithmetically operated with respect to the opening degree of the exhaust control valve does not match the actual intake air amount is established. Therefore, even if any abnormal operation of the exhaust control valve occurs, the mixture can be prevented from becoming lean, and thus the engine can be prevented from seizing and being damaged.

In a preferred mode of the present invention, the injection amount determination means is comprised so that when the valve abnormality detection means detects the abnormality of operation of the exhaust control valve, the injection amount takes a value higher than the value determined by the control condition at a normal state within a range not exceeding a maximum value that the injection amount can take for the control condition at the normal state.

As described above, when the operation of the exhaust control valve becomes abnormal, if the fuel injection amount is increased within the range at the normal state to make the air-fuel mixture rich, the output of the engine decreases, but the operation of the engine can be continued. Therefore, an event that the driver who drives the vehicle and the like driven by the engine cannot reach his/her destination can be prevented from occurring.

In the present invention, when the operation of the exhaust control valve becomes abnormal, the fuel injection amount may be increased to a range exceeding the range at the normal state to make the mixture rich. If the fuel injection amount is increased to a range exceeding the range at the normal state in this manner when the exhaust control valve is abnormal, the output of the engine decreases significantly, so that the occurrence of abnormality can be informed to the driver. Therefore, an event that the driver continues driving operation without noticing the occurrence of abnormality of the- exhaust control valve can be prevented.

If the fuel injection amount is increased to change the air-fuel ratio of mixture to the rich side as described above when the operation of the exhaust control valve becomes abnormal, in most cases, the seizure of the engine can be prevented. However, in order to prevent the seizure of the engine more surely, it is preferable to set the ignition timing to the delay side.

Thereupon, in a preferred mode of the present invention, the ignition timing determination means is comprised so that, when the valve abnormality detection means detects the abnormality of operation of the exhaust control valve, the ignition timing of the internal combustion engine is delayed with respect to the ignition timing determined for the control condition at the normal state.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIGS. 5A and 5B are map configuration views showing configuration examples of an ignition timing arithmetical operation map used when an exhaust control valve is at a fully-opened position and an ignition timing arithmetical operation map used when the exhaust control valve is at a fully-closed position as an example of an ignition timing arithmetical operation map prepared when the ignition timing is arithmetically operated for a plurality of openings of the exhaust control valve in the present invention;

FIGS. 6A and 6B are map configuration views showing configuration examples of an injection amount determining variable arithmetical operation map used when an exhaust control valve is at the fully-opened position and an injection amount determining variable arithmetical operation map used when the exhaust control valve is at the fully-closed position as an example of an injection amount determining variable arithmetical operation map prepared when the injection amount determining variable is arithmetically operated for a plurality of openings of the exhaust control valve in the present invention;

FIGS. 8A and 8B are map configuration views showing configuration examples of a normal state injection amount determining variable arithmetical operation map and an abnormal state injection amount determining variable arithmetical operation map used when the injection time is arithmetically operated by using different maps according to the case when the operation of an exhaust control valve is normal and abnormal in the present invention;

FIGS. 9A and 9B are map configuration views showing configuration examples of an injection time correction data arithmetical operation map used for correcting the injection time and an ignition timing correction data arithmetical operation map used for correcting the ignition timing when the operation of an exhaust control valve is abnormal in the present invention; and FIGS. 10A and 10B are map configuration views showing configuration examples of an injection amount determining variable arithmetical operation map used when the injection time is arithmetically operated and an ignition timing arithmetical operation map used when the ignition timing is arithmetically operated by estimating the intake air amount from the intake pipe pressure and the rotational speed in the present invention.

DETAILED DESCRIPTION OF THE PREFERRED EMBODIMENTS

Figure 1:
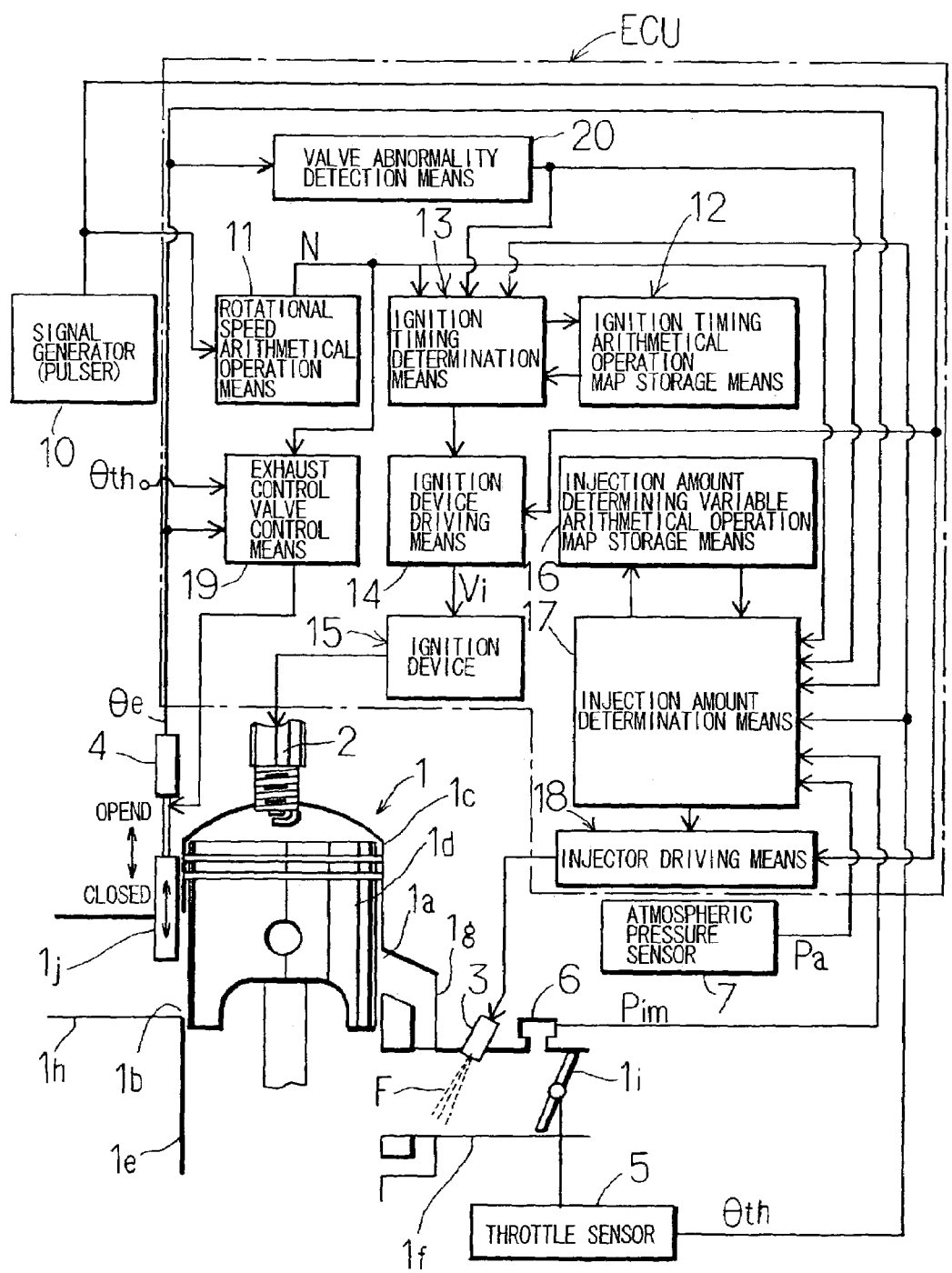
FIG. 1 is a block diagram showing a general configuration of one embodiment in accordance with the present invention.

FIG. 1 is a block diagram showing a configuration of a first embodiment in accordance with the present invention. In FIG. 1, reference numeral 1 denotes a two-cycle internal combustion engine. This internal combustion engine 1 includes a cylinder 1c having a scavenging port 1a and an exhaust port 1b, a piston 1d provided in the cylinder 1c, an intake pipe 1f connected to a crankcase 1e, a scavenging passage 1g connecting the crankcase 1e to the scavenging port 1a, an exhaust pipe 1h connected to the exhaust port 1b, a throttle valve 1i attached to the intake pipe 1f, and an exhaust control valve 1j provided so as to open and close an upper part of the exhaust port 1b. An ignition plug 2 is mounted on an upper part of the cylinder 1c, and an injector (electromagnetic fuel injection valve) 3 is attached to the intake pipe 1f.

In order to prevent an air-fuel mixture from flowing backward through the intake pipe when the pressure in the crankcase 1e is increased in a process in which the piston lowers toward a bottom dead center, backward flow inhibiting means such as a reed valve is provided, but the illustration of this means is omitted.

Although not shown in the drawing, the injector 3 is supplied with fuel from a fuel tank via a fuel pump. The injector 3 injects fuel F into the intake pipe 1f by opening its valve when a driving current is supplied from injector driving means. The pressure of fuel supplied by the injector 3 (fuel pressure) is kept constant by a pressure regulator, so that the amount of fuel injected from the injector 3 (injection amount) is determined by time for which fuel is injected (injection time).

The exhaust control valve 1j which opens and closes the upper part of the exhaust port 1b is provided to adjust the exhaust timing. When the opening degree of the exhaust control valve 1j is increased, the exhaust timing is advanced, and when the opening degree of the exhaust control valve 1j is decreased, the exhaust timing is delayed. At the time when the rotational speed of the engine is low, if the opening degree of the exhaust control valve 1j is decreased to delay the exhaust timing, the pulsation effect of exhaust acts greatly, so that the charging efficiency increases. At the time when the rotational speed of the engine is high, if the opening degree of the exhaust control valve 1j is increased to advance the exhaust timing, the pulsation effect of exhaust acts greatly, so that the charging efficiency increases.

To obtain the opening information of the exhaust control valve 1j, a valve opening sensor 4 is connected to the exhaust control valve 1j. This valve opening sensor 4 can be comprised by a position sensor for detecting the position of the exhaust control valve 1*j*. As the position sensor, for example, a potentiometer can be used.

Also, to detect the opening degree of the throttle valve 1*i*, a throttle sensor 5 is connected to a rotating shaft of the throttle valve 1*i*. This throttle sensor 5 can also be comprised by a position sensor consisting of a potentiometer and the like.

The intake pipe 1*f* of the internal combustion engine is fitted with an intake pressure sensor 6 for detecting the pressure in the intake pipe 1*f* on the downstream side of the throttle valve 1*i*. In this embodiment, in addition to the intake air sensor 6, an atmospheric pressure sensor 7 for detecting the atmospheric pressure is installed on the engine.

The internal combustion engine is also provided with a signal generator (pulser) 10 for generating a pulse signal including crank angle information of the engine. The signal generator 10 generates, for example, a first pulse when a crank angle position (a rotational angle position of a crankshaft) of the engine coincides with a reference position set at a position advanced sufficiently from a top dead center position (a crank angle position at the time when a piston reaches the top dead center), and generates a second pulse having a polarity different from that of the first pulse when the crank angle position coincides with a reference position at which measurement of the ignition timing is started at a position advanced slightly from the top dead center position.

The first pulse generated by the signal generator 10 is used as a reference signal for determining the timing for starting the measurement of the ignition timing of the engine or a signal for determining the timing for starting fuel injection. The second pulse generated by the signal generator 10 is used as a signal for determining the ignition timing at the time when the engine rotates at a low speed, at which time the measurement of ignition timing arithmetically operated by a microprocessor cannot be made exactly.

To control the internal combustion engine, an electronic control unit ECU provided with a microprocessor, an ignition device, and the like is provided. The ECU shown in FIG. 1 includes rotational speed arithmetical operation means 11, ignition timing arithmetical operation map storage means 12, ignition timing determination means 13, ignition device driving means 14, an ignition device 15, injection amount determining variable arithmetical operation map storage means 16, injection amount determination means 17, injector driving means 18, exhaust control valve control means 19, and valve abnormality detection means 20.

Of these elements, the rotational speed arithmetical operation means 11, the ignition timing arithmetical operation map storage means 12, the ignition timing determination means 13, the injection amount determining variable arithmetical operation map storage means 16, the injection amount determination means 17, and the valve abnormality detection means 20 are comprised by executing a predetermined program by the microprocessor. The ignition device driving means 14, the injector driving means 18, and the exhaust control valve control means 19 are comprised by executing a predetermined program by the microprocessor and are comprised of hardware such as a driving circuit for generating an electrical signal and an actuator.

The following is a further detailed description of each element. The rotational speed arithmetical operation means 11 is comprised so as to arithmetically operate the rotational speed of the engine from the generation interval (time taken for the engine to rotate through a predetermined angle) of pulses generated by the signal generator 10 by using the output of the signal generator 10 as an input. The rotational speed information N arithmetically operated by the rotational speed arithmetical operation means 11 is sent to the ignition timing determination means 13, the injection amount determination means 17, and the exhaust control valve control means 19.

The ignition timing arithmetical operation map storage means 12 stores the relationship between the rotational speed and the opening degree of the throttle valve (throttle opening) of the engine and the ignition timing data in a ROM or EEPROM in a form of table as shown in FIG. 5. In this embodiment, the ignition timing arithmetical operation map storage means 12 stores a fully-opened position ignition timing arithmetical operation map Mi1 shown in FIG. 5A and a fully-closed position ignition timing arithmetical operation map Mi2 shown in FIG. 5B. In this case, the fully-opened position ignition timing arithmetical operation map Mi1 is a map for giving the relationship between the rotational speed and the throttle opening degree and the ignition timing data at the time when the exhaust control valve 1*j* is at the fully-opened position, and the fully-closed position ignition timing arithmetical operation map Mi2 is a map for giving the relationship between the rotational speed and the throttle opening degree and the ignition timing data at the time when the exhaust control valve 1*j* is at the fully-closed position. Herein, the ignition timing data is given in a form of time measured by an ignition timer (timer provided in the microprocessor) during the time when the crankshaft of the engine rotates from the reference position to a rotational angle position corresponding to the ignition timing (ignition position).

The ignition timing determination means 13 reads out the map stored by the ignition timing arithmetical operation map storage means 12 according to the opening degree of the exhaust control valve, and arithmetically operates the ignition timing data with respect to the rotational speed information N of the engine and throttle opening information θth given by the throttle sensor 5. When the rotational speed information N and the throttle opening information θth given by the rotational speed arithmetical operation means 11 and the throttle sensor 5, respectively, shift from a value constituting the map (for example, in the example shown in FIG. 5, when the rotational speed lies between 1000 rpm and 1500 rpm), the ignition timing data is arithmetically operated by interpolation. Also, when the exhaust control valve lies at an intermediate position between the fully-closed position and the fully-opened position, the ignition timing data is determined by interpolation from the ignition timing arithmetically operated by using the fully-closed position ignition timing arithmetical operation map and the ignition timing arithmetically operated by using the fully-opened position ignition timing arithmetical operation map.

In the example shown in the drawing, two maps, the fully-opened position ignition timing arithmetical operation map Mi1 and the fully-closed position ignition timing arithmetical operation map Mi2, are prepared as an ignition timing arithmetical operation map. However, an ignition timing arithmetical operation map for another opening degree of the exhaust control valve, for example, an ignition timing arithmetical operation map for an intermediate position may further be prepared to arithmetically operate the ignition timing delicately with respect to the opening degree of the exhaust control valve.

Also, in this embodiment, the output of the valve abnormality detection means 20 is given to the ignition timing determination means 13 so that the ignition timing is arithmetically operated by using a different ignition timing arithmetical operation map in the case when the valve abnormality detection means 20 detects the abnormality of operation of the exhaust control valve 1j and in the case when it does not detect the abnormality.

Specifically, the ignition timing determination means 13 is comprised so that when the valve abnormality detection means 20 does not detect the abnormality of the operation of the exhaust control valve 1j, the ignition timing determination means 13 arithmetically operates the ignition timing by using the ignition timing arithmetical operation map selected in accordance with the opening degree of the exhaust control valve 1j detected by the valve opening sensor, and when the valve abnormality detection means 20 detects the abnormality of operation of the exhaust control valve, the maps stored in the ignition timing arithmetical operation map storage means 12 are compared, and the ignition timing determination means 13 arithmetically operates the ignition timing by using the ignition timing arithmetical operation map in which the arithmetically operated ignition timing is delayed most.

The ignition device driving means 14 sets, to the ignition timer, the ignition timing data, which is determined by the ignition timing determination means 13 when information that the reference pulse (first pulse) showing the reference position has been generated from the signal generator 10 is given, starts the measurement of ignition timing data, and gives an ignition signal Vi to the ignition device 15 when the ignition timer finishes the measurement of ignition timing data.

The ignition device 15 is a publicly known device provided with an ignition coil and a primary current control circuit of an appropriate form in which a sudden change in primary current in the ignition coil is caused when the ignition signal is given. By the sudden change in primary current in the ignition coil caused when the ignition signal is given, a high voltage for ignition is induced in a secondary coil of the ignition coil. This high voltage is applied to the ignition plug 2 mounted on the cylinder of the engine, so that the ignition plug 2 causes spark discharge, by which the engine is ignited.

The injection amount determining variable arithmetical operation map storage means 16 stores a plurality of injection amount determining variable arithmetical operation maps prepared for different values of opening degree of the exhaust control valve. The injection amount determining variable arithmetical operation map gives the relationship between the rotational speed and the throttle opening degree of the engine and the fuel injection amount determining variable. Each injection amount determining variable arithmetical operation map is stored in the ROM or EEPROM in a form of table.

In this embodiment, the injection amount determining variable arithmetical operation map storage means 16 stores a fully-opened position injection amount determining variable arithmetical operation map Mf1 of a configuration shown in FIG. 6A and a fully-closed position injection amount determining variable arithmetical operation map Mf2 of a configuration shown in FIG. 6B. The fully-opened position injection amount determining variable arithmetical operation map Mf1 is a map for giving the relationship between the rotational speed and the throttle opening degree and the injection amount determining variable (injection time in an example shown in FIG. 6) at the time when the exhaust control valve 1j is at the fully-opened position, and the fully-closed position injection amount determining variable arithmetical operation map Mf2 is a map for giving the relationship between the rotational speed and the throttle opening and the injection amount determining variable at the time when the exhaust control valve 1j is at the fully-closed position.

The "injection amount determining variable" is a variable for determining the amount of fuel injected from the injector 3, and may be an injection time or an fuel injection amount itself as described above. In the description below, however, the basic injection time before correction made according to the intake pipe pressure and the atmospheric pressure is used as an injection amount determining variable.

The injection amount determination means 17 arithmetically operates correction coefficients Kim, Ka, and Kθ for the intake pipe pressure information Pim detected by the intake pressure sensor 6, the atmospheric pressure Pa detected by the atmospheric pressure sensor 7, and the exhaust control valve opening information θe detected by the valve opening sensor 4, respectively, and arithmetically operates the actual injection time by multiplying the basic injection time arithmetically operated from the injection amount determining variable arithmetical operation map by these correction coefficients.

Although not shown in FIG. 1, in some cases, other parameters such as engine temperature and intake temperature are further detected, and the injection time is corrected for these parameters.

The injector driving means 18 sets to an injection timer the injection time arithmetically operated by the injection amount determination means 17 when information that the reference pulse has been generated from the signal generator 10 is given, starts the measurement of the injection time, and gives a driving current to the injector 3 during the time when the injection timer is making measurement of injection time, by which fuel is injected from the injector 3.

In the example shown in the drawing, two maps of the fully-opened position injection amount determining variable arithmetical operation map Mf1 and the fully-closed position injection amount determining variable arithmetical operation map Mf2 are prepared as an injection amount determining variable arithmetical operation map. However, an injection amount determining variable arithmetical operation map for another opening degree of the exhaust control valve, for example, an injection amount determining variable arithmetical operation map at the time when the exhaust control valve is at an intermediate position may further be prepared to arithmetically operate the injection amount precisely with respect to the opening degree of the exhaust control valve.

Also, in this embodiment, the output of the valve abnormality detection means 20 is given to the injection amount determination means 17 so that the injection time is arithmetically operated by using an injection amount determining variable arithmetical operation map which is different when the valve abnormality detection means 20 detects the abnormality of operation of the exhaust control valve 1j and when it does not detect the abnormality.

Specifically, the injection amount determination means 17 is comprised so that when the valve abnormality detection means 20 does not detect the abnormality of operation of the exhaust control valve 1j, the injection amount determination means 17 arithmetically operates the injection time by using the injection amount determining variable arithmetical operation map selected in accordance with the opening degree of the exhaust control valve 1j detected by the valve opening sensor, and when the valve abnormality detection means 20 detects the abnormality of operation of the exhaust control valve, the maps stored in the injection amount determining variable arithmetical operation map storage means 16 are compared, and the injection amount determination means 17 arithmetically operates the injection time by using the injection amount determining variable arithmetical operation map in which the arithmetically operated injection time is at the maximum (injection amount is at the maximum).

The exhaust control valve control means 19 controls an electric actuator (not shown) for driving the exhaust control valve 1j so that the opening degree of the exhaust control valve 1j coincides with the desired opening degree for each rotational speed and the throttle opening degree by using the output of the valve opening sensor 19, the rotational speed information N given by the rotational speed arithmetical operation means 11, and the throttle opening information θth given by the throttle sensor 5.

The valve abnormality detection means 20 detects the abnormality of operation of the exhaust control valve 1j by any of the following methods by using the exhaust control valve opening information θe given by the valve opening sensor 4.

(a) The valve abnormality detection means is comprised so that when it is detected that the opening degree of the exhaust control valve detected by the valve opening sensor is out of the control range, it is detected that the exhaust control valve is abnormal.

Since the control range (range from fully-closed position to fully-opened position) of the opening degree of the exhaust control valve is determined in advance, when it is detected that the opening degree of the exhaust control valve is out of the control range, it can be judged that the operation of the control system of the exhaust control valve or the mechanical system for driving the exhaust control valve is abnormal.

(b) The valve abnormality detection means is comprised so that when the output of the valve opening sensor does not exhibit an expected change for a driving signal outputted by the exhaust control valve control means to operate the exhaust control valve, the abnormality of the exhaust control valve is detected.

When the exhaust control valve control means gives a driving signal to the actuator to operate the exhaust control valve, the degree of operation of the exhaust control valve performed by the driving signal (the degree of change in output of the valve opening sensor) can be predicted. In the case where the valve opening sensor 4 does not exhibit the expected change when the exhaust control valve control means outputs the driving signal, it is supposed that the exhaust control valve is difficult to operate due to adhesion of carbon and the like or any trouble occurs in the mechanical system for driving the exhaust control valve.

(c) The valve abnormality detection means is comprised so that, when it is detected that the output of the valve opening sensor is changed in the state in which the exhaust control valve control means does not output a driving signal for operating the exhaust control valve, the abnormality of the exhaust control valve is detected. In this case, it is supposed that abnormality occurs in the control system of the exhaust control valve.

(d) The valve abnormality detection means is comprised so that when a difference between the desired position of the exhaust control valve intended by the exhaust control valve control means and the position of the exhaust control valve detected by the valve opening sensor is not in the allowable range, the abnormality of the exhaust control valve is detected. In this case, it is expected that abnormality occurs in the control system of the exhaust control valve or the exhaust control valve is difficult to operate due to adhesion of carbon and the like.

(e) The valve abnormality detection means is comprised so that when it is detected that the time change rate of output of the valve opening sensor does not exceed the judgment value corresponding to the lower limit value of variation range of displacement rate at the normal state of the exhaust control valve in the state in which the exhaust control valve control means outputs a driving signal for operating the exhaust control valve, the abnormality of the exhaust control valve is detected. In this case as well, it is expected that the exhaust control valve is difficult to operate due to adhesion of carbon and the like.

As described above, when the operation of the exhaust control valve 1j becomes abnormal, if the fuel injection amount is increased within the range at the normal state to make the air-fuel mixture rich, the output of the engine decreases, but the operation of the engine can be continued. Therefore, an event that the driver who drives the vehicle and the like driven by the engine cannot reach his/her destination can be prevented from occurring.

In the present invention, when the operation of the exhaust control valve becomes abnormal, the fuel injection amount may be increased to a range exceeding the range to be taken at the normal state to make the mixture rich. If the fuel injection amount is increased to a range exceeding the range to be taken at the normal state in this manner when the exhaust control valve is abnormal, the output of the engine decreases significantly, so that the occurrence of abnormality can be informed to the driver. Therefore, an event that the driver continues driving operation without noticing the occurrence of abnormality of the exhaust control valve can be prevented.

If the fuel injection amount is increased to change the air-fuel ratio of mixture to the rich side as described above when the operation of the exhaust control valve becomes abnormal, in most cases, the seizure of the engine can be prevented. In order to prevent the seizure of the engine more surely, however, it is preferable that the ignition timing is set to the delay side as in the above-described embodiment when the abnormality of operation of the exhaust control valve is detected.

In the above-described example, the injection amount determining variable arithmetical operation maps for many different openings of the exhaust control valve are prepared, and a map in which the injection amount arithmetically operated when the abnormality of the exhaust control valve is detected is most is selected to arithmetically operate the injection amount determining variable. However, different injection amount determining variable arithmetical operation maps may be used at the normal state when the operation of the exhaust control valve is normal and at the abnormal state when the operation of the exhaust control valve is abnormal.

That is to say, the control unit in accordance with the present invention may be comprised so as to include the valve opening sensor for detecting the opening degree of the exhaust control valve, the injection amount determining variable arithmetical operation map storage means which stores a plurality of injection amount determining variable arithmetical operation maps for the normal state which are prepared for different values of opening degree of the exhaust control valve detected by the valve opening sensor and an injection amount determining variable arithmetical operation map for the abnormal state which is used when the operation of the exhaust control valve is abnormal, and the valve abnormality detection means which detects the occurrence of abnormality of the operation of the exhaust control valve. In this case, the injection amount determination means is comprised so that, when the abnormality of the exhaust control valve is not detected by the valve abnormality detection means, the injection amount determining variable arithmetical operation map for the normal state selected according to the opening degree of the exhaust control valve detected by the valve opening sensor is used to arithmetically operate the injection amount determining variable, and when the abnormality of the exhaust control valve is detected, of the maps stored in the injection amount determining variable arithmetical operation map storage means, the injection amount determining variable arithmetical operation map for the abnormal state is used to arithmetically operate the injection amount determining variable.

In this case, injection amount determining variable arithmetical operation maps for the normal state Mfn as shown in FIG. 8A are prepared for a plurality of openings of the exhaust control valve and are stored in the injection amount determining variable arithmetical operation map storage means 16, and an injection amount determining variable arithmetical operation map for the abnormal state Mfa as shown in FIG. 8B is stored in the injection amount determining variable arithmetical operation map storage means 16. The injection amount determining variable arithmetical operation map for the abnormal state Mfa is comprised so that the injection amount determined by the injection amount determining variable arithmetically operated using this map is higher than the value determined by various control conditions at the normal state.

The injection amount determination means 17 is comprised so that, when the abnormality of the operation of the exhaust control valve is not detected by the valve abnormality detection means 20, the injection amount determining variable (injection time in this example) is arithmetically operated by using the injection amount determining variable arithmetical operation map for the normal state Mfn (FIG. 8B) selected according to the opening degree of the exhaust control valve 1j detected by the valve opening sensor 4, and when the abnormality of the exhaust control valve is detected, of the maps stored in the injection amount determining variable arithmetical operation map storage means 16, the injection amount determining variable arithmetical operation map for the abnormal state Mfa (FIG. 8A) is used to arithmetically operate the injection amount determining variable.

Figure 7A:
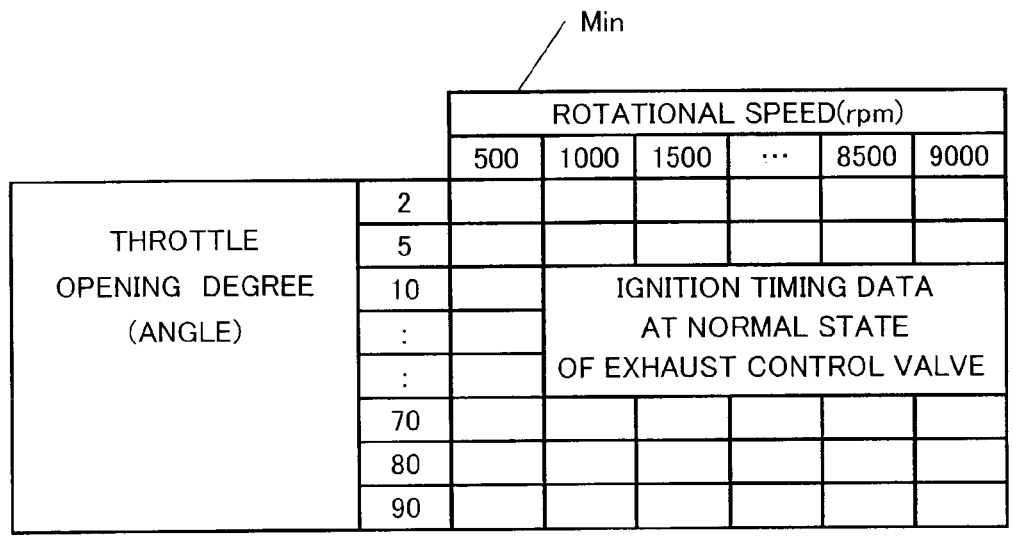
FIGS. 7A and 7B are map configuration views showing configuration examples of a normal state ignition timing arithmetic operation map and an abnormal state ignition timing arithmetical operation map used when the ignition timing is arithmetically operated by using different maps according to the case when the operation of an exhaust control valve is normal and abnormal in the present invention.
Figure 7B:
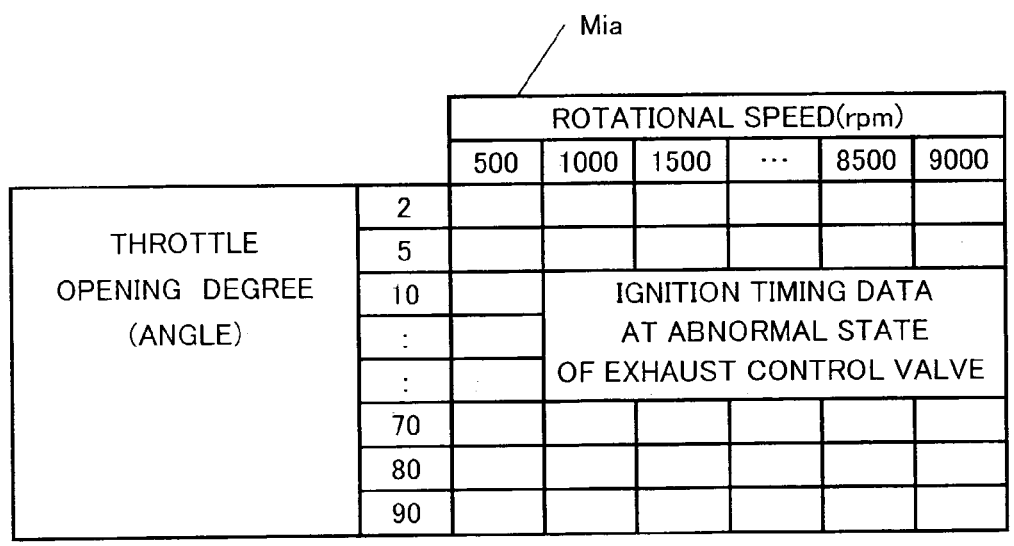

Similarly, a plurality of ignition timing arithmetical operation maps for the normal state Min (FIG. 7A) which is prepared for different values of opening degree of the exhaust control valve and an ignition timing arithmetical operation map for the abnormal state Mia (FIG. 7B) which is used when the operation of the exhaust control valve is abnormal are stored in the ignition timing arithmetical operation map storage means 12. When the abnormality of operation of the exhaust control valve is not detected by the valve abnormality detection means 20, the ignition timing is arithmetically operated by using the ignition timing arithmetical operation map for the normal state selected according to the opening degree of the exhaust control valve 1j detected by the valve opening sensor 4, and when the abnormality of the exhaust control valve 1j is detected, of the maps stored in the ignition timing arithmetical operation map storage means 12, the ignition timing arithmetical operation map for the abnormal state is used to arithmetically operate the ignition timing. In this case, the ignition timing arithmetical operation map for the abnormal state Mia is prepared so that the ignition timing at each rotational speed is delayed with respect to the ignition timing at the normal state.

Also, in the present invention, the injection amount determining variable arithmetical operation map for the abnormal state can be comprised so that, when the abnormality of the exhaust control valve is detected, the injection amount determining variable determined by the injection amount determination means is corrected to the side on which the injection amount is increased within the range not exceeding the maximum value that the injection amount can take for the control condition at the normal state.

In this case, there is provided the injection amount determining variable arithmetical operation map storage means 16 that stores a plurality of injection amount determining variable arithmetical operation maps prepared for different values of opening degree of the exhaust control valve, and also there are provided injection amount determining variable correction data arithmetical operation means (not shown) that arithmetically operates injection amount determining variable correction data for various control conditions, which injection amount determining variable correction data is used to correct the injection amount determining variable determined by the injection amount determination means 17 to the increase side within the range not exceeding the maximum value that the injection amount can take at the normal state for the control condition when the operation of the exhaust control valve is abnormal, and injection amount correction means that corrects the injection amount determining variable determined by the injection amount determination means 17 so that the injection amount takes an increased value by using the injection amount determining variable correction data arithmetically operated by the injection amount determining variable correction data arithmetical operation means when the abnormality of the exhaust control valve is detected by the valve abnormality detection means 20.

In the case where the injection amount determining variable is injection time, the injection amount determining variable correction data arithmetical operation means can be comprised so as to arithmetically operate injection time correction data with respect to the throttle opening and rotational speed of the engine by using an injection time correction data arithmetical operation map Mc1 which shows the relationship between the throttle opening and the rotational speed and the injection time correction data in a form of table, for example, as shown in FIG. 9A.

In this case, the injection time correction data may be a correction coefficient (>1) multiplied by the injection time determined by the injection amount determination mean 17 or may be a correction number added to the injection time determined by the injection amount determination mean 17 to increase the injection amount.

Similarly, ignition timing correction data arithmetical operation means that arithmetically operates ignition timing correction data for various control conditions, which is used to correct the ignition timing determined by the ignition timing determination means 13 to the delay side when the operation of the exhaust control valve is abnormal, and ignition timing correction means that corrects the ignition timing determined by the ignition timing determination means 13 so that the ignition timing is made delayed timing by using the ignition timing correction data arithmetically operated by the ignition timing correction data arithmetical operation means when the abnormality of operation of the exhaust control valve 1j is detected by the valve abnormality detection means 20 may be provided to correct the ignition timing to the delay side when the operation of the exhaust control valve is abnormal.

The ignition timing correction means above described can be comprised so as to arithmetically operate the ignition timing correction data with respect to the throttle opening and the rotational speed of the engine by using an ignition timing correction data arithmetical operation map Mc2 which shows the relationship between the throttle opening and the rotational speed and the ignition timing correction data in a form of table, for example, as shown in FIG. 9B.

The ignition timing correction data may be a correction coefficient (>1) multiplied by the ignition timing (measured value measured by the ignition timer) determined by the ignition timing determination mean 13 or may be a correction number added to the ignition timing (measured value measured by the ignition timer) determined by the ignition timing determination mean 13 to delay the ignition timing.

Figure 2:
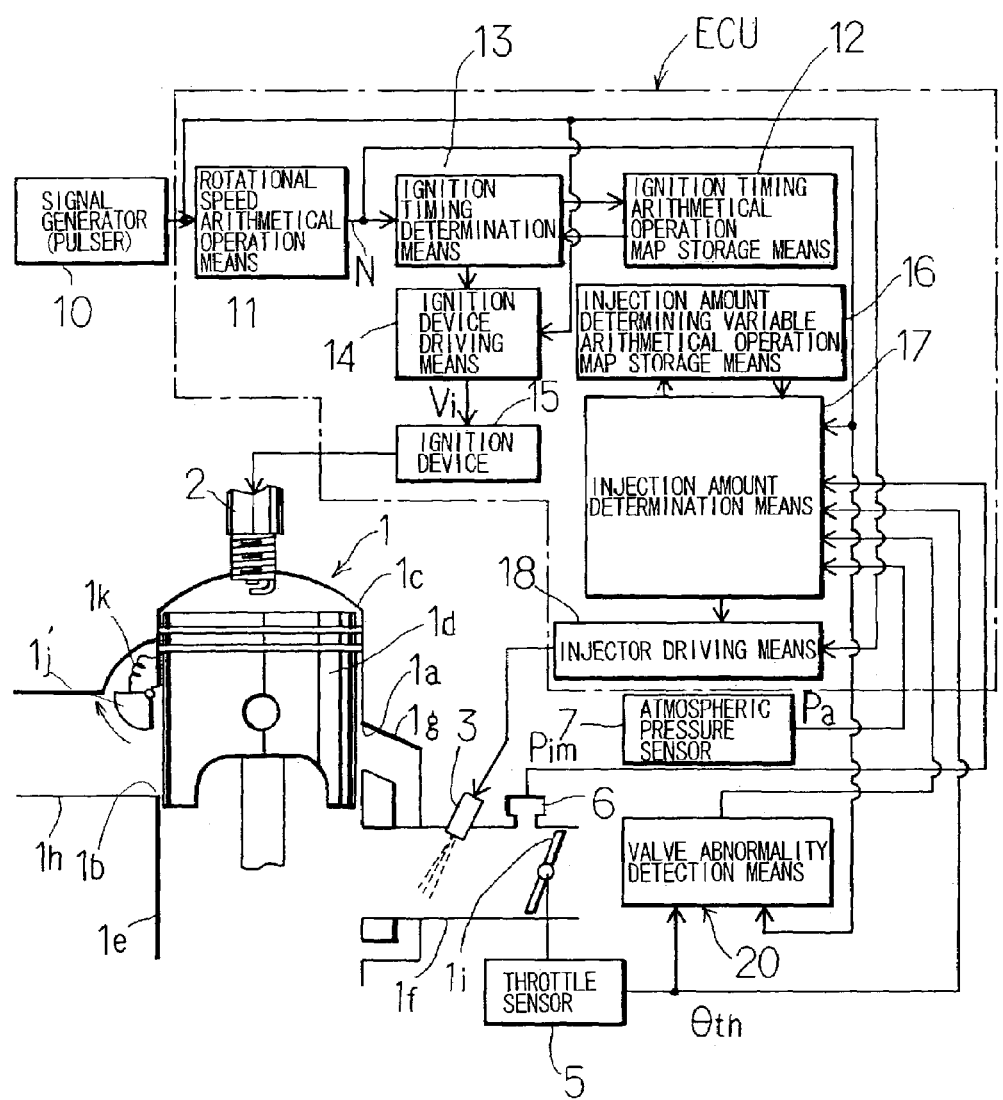
FIG. 2 is a block diagram showing a general configuration of another embodiment in accordance with the present invention.

In the above-described example, the exhaust control valve control means 19 for controlling the exhaust control valve 1j with respect to the rotational speed and the throttle opening degree of the engine is provided. However, the present invention can also be applied to a two-cycle internal combustion engine in which as shown in FIG. 2, a fan-shaped exhaust control valve 1j' which is rotatably supported at the upper part of the exhaust port 1b is provided, and a spring 1k which urges the exhaust control valve 1j' to the closed position side is provided, by which the opening degree of the exhaust control valve 1j' is changed automatically by utilizing the force balance between the exhaust pressure and the urging force of the spring 1k.

In the two-cycle internal combustion engine provided with such an exhaust control valve, the opening degree of the exhaust control valve increases with increasing the rotational speed of the engine. Therefore, the opening degree of the exhaust control valve can be estimated by monitoring the rotational speed without providing a valve opening sensor.

In the above-described internal combustion engine, in the case where the intake air amount is estimated from the throttle opening and the rotational speed of the engine and thereby the injection amount for obtaining a predetermined air-fuel ratio is determined, the valve abnormality detection means 20 can be comprised so as to detect the abnormality of operation of the exhaust control valve, when it is detected that the rotational speed arithmetically operated by the rotational speed arithmetical operation means 11 is lower than a set value despite the fact that it is detected for more than set time by the throttle sensor 5 that the throttle valve 1i is in a fully-opened state.

Figure 4:
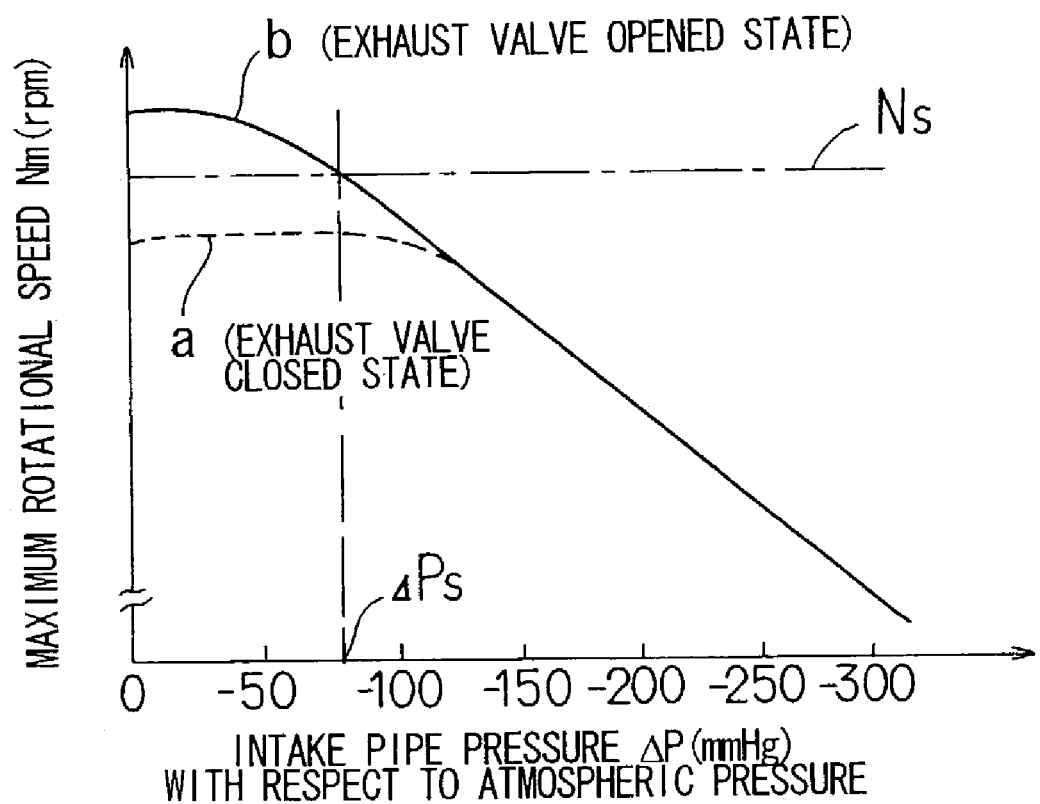
FIG. 4 is a graph showing a relationship between a maximum rotational speed and an intake pipe pressure with respect to an atmospheric pressure in a two-cycle internal combustion engine in which a fuel injection amount is determined by estimating the intake air amount from the intake pipe pressure and the rotational speed.

Also, in the case where the intake air amount is estimated from the intake pipe pressure and the rotational speed of the engine and thereby the fuel injection time necessary for obtaining a predetermined air-fuel ratio with respect to the estimated intake air amount, the maximum rotational speed Nm of the engine changes as shown in FIG. 4 with respect to the intake pipe pressure with respect to the atmospheric pressure (difference between the atmospheric pressure and the intake pipe pressure) $\Delta P$. In FIG. 4, curve a indicates the characteristic at the time when the exhaust control valve is in a fully-closed state, and curve b indicates the characteristic at the time when the exhaust control valve is in a fully-opened state. Also, Ns designates the set value of the rotational speed which is used as a judgment reference at the time when it is judged whether or not the operation of the exhaust control valve is abnormal, and $\Delta Ps$ denotes the set value of $\Delta P$ which is used as a judgment reference at the time when it is judged whether or not the operation of the exhaust control valve is abnormal.

Figure 3:
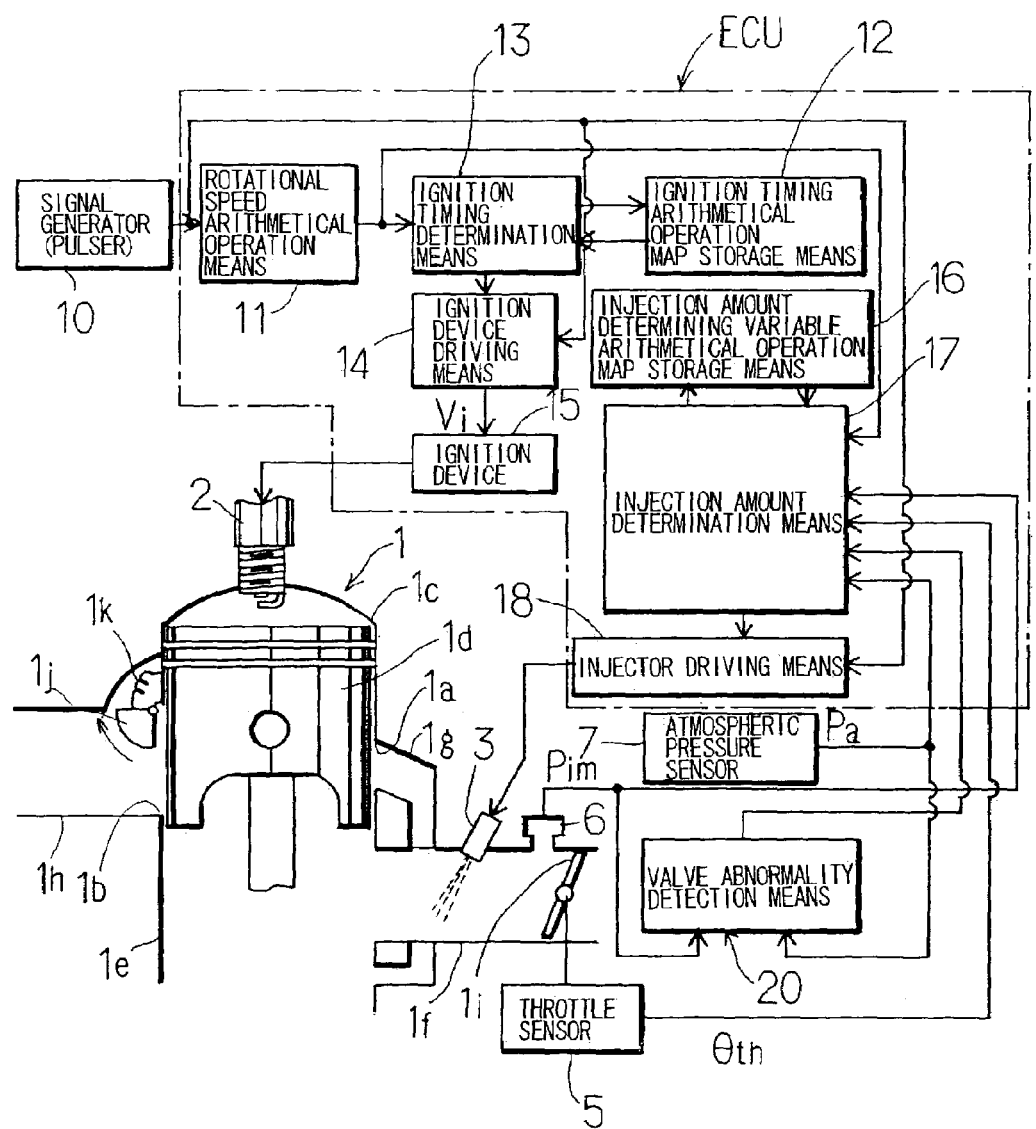
FIG. 3 is a block diagram showing a general configuration of further embodiment in accordance with the present invention.

In this case, the valve abnormality detection means 20 can be comprised so as to detect the abnormality of operation of the exhaust control valve 1j' when the rotational speed of internal combustion engine cannot exceed the set value Ns despite the fact that a difference between the atmospheric pressure and the intake pipe pressure is not larger than the set value $\Delta Ps$ by using atmospheric pressure information Pa detected by the atmospheric pressure sensor 7 and intake pipe pressure information Pim detected by the intake pressure sensor 6 as inputs as shown in FIG. 3.

Even in the case where the abnormality of operation of the exhaust control valve is detected without detecting the opening degree of the exhaust control valve as in the examples shown in FIGS. 2 and 3, the control at the time when the abnormality of operation of the exhaust control valve 1j' is detected is the same as in the case where the abnormality of operation of the valve is detected by detecting the opening degree of the exhaust control valve. That is to say, even in the case where the abnormality of operation of the exhaust control valve is detected without detecting the opening degree of the exhaust control valve, the injection amount determination means is comprised so that when the abnormality of operation of the exhaust control valve 1j' is detected, the injection amount is increased to a value higher than the value determined by the control condition at the normal state, or the injection amount determination- means is comprised that the injection amount is increased to a value higher than the value determined by the control condition at the normal state within the range not exceeding the maximum value that the injection amount can take for the control condition at the normal state.

In the case where the fuel injection amount is determined by estimating the intake air amount from the intake pipe pressure and the rotational speed, injection time data is arithmetically operated by using an injection amount determining variable arithmetical operation map Mf which shows the relationship between the intake pipe pressure and rotational speed and the injection time data in a form of table as shown in FIG. 10A. Also, the ignition timing is arithmetically operated by using an ignition timing arithmetical operation map Mi which shows the relationship between the intake pipe pressure and the rotational speed and the ignition timing data in a form of table as shown in FIG. 10B.

Although the injection time is used as an injection amount determining variable in the above-described embodiment, an injection amount itself may be used as an injection amount determining variable and an injection amount determining variable arithmetical operation map may be prepared. When the map is comprised in this manner, the injection amount is arithmetically operated for various control conditions, so that it is necessary to perform arithmetical operation to convert the injection amount into injection time in the injector driving means 18.

In the above-described embodiment, when the abnormality of operation of the exhaust control valve is detected, the fuel injection amount is increased to a value higher than the value at the normal state, by which the mixture is kept in a rich state, and the ignition timing is delayed. However, the ignition timing need not necessarily be delayed because the seizure of the engine can be prevented by making the mixture in a rich state.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. An electronic control unit for a two-cycle internal combustion engine with an exhaust control valve, comprising:
    an injector for supplying fuel to the internal combustion engine with the exhaust control valve whose opening is changed to adjust exhaust timing;
    injection amount determination means for determining an injection amount determining variable, which determines the injection amount of fuel injected from said injector, for various control conditions;
    injector driving means for driving said injector so as to inject fuel of the injection amount determined by the injection amount determining variable determined by said injection amount determination means;
    ignition timing determination means for determining the ignition timing of said internal combustion engine for various control conditions; and
    ignition device driving means for driving an ignition device which ignites said internal combustion engine and performing igniting operation when the ignition timing determined by said ignition timing determination means is detected,
    wherein said electronic control unit further comprises valve abnormality detection means for detecting the abnormality of operation of said exhaust control valve; and
    said injection amount determination means is comprised so that, when said valve abnormality detection means detects the abnormality of operation of said exhaust control valve, said injection amount is increased to a value higher than the value determined by said control condition at the normal state within a range not exceeding the maximum value that said injection amount can take for said control condition at the normal state.

2. The electronic control unit for a two-cycle internal combustion engine with an exhaust control valve according to claim 1,
    wherein said ignition timing determination means is comprised so that, when said valve abnormality detection means detects the abnormality of operation of said exhaust control valve, the ignition timing of said internal combustion engine is delayed with respect to the ignition timing determined for said control condition at the normal state.

3. An electronic control unit for a two-cycle internal combustion engine with an exhaust control valve, comprising:
    an injector for supplying fuel to the internal combustion engine with the exhaust control valve whose opening is changed to adjust exhaust timing;
    injection amount determination means for determining an injection amount determining variable, which determines the injection amount of fuel injected from said injector, for various control conditions;
    injector driving means for driving said injector so as to inject fuel of the injection amount determined by the injection amount determining variable determined by said injection amount determination means;
    ignition timing determination means for determining the ignition timing of said internal combustion engine for various control conditions; and
    ignition device driving means for driving an ignition device which ignites said internal combustion engine and performing igniting operation when the ignition timing determined by said ignition timing determination means is detected,
    wherein said electronic control unit further comprises a valve opening sensor for detecting an opening degree of said exhaust control valve; injection amount determining variable arithmetical operation map storage means which stores a plurality of injection amount determining variable arithmetical operation maps prepared for different values of the opening degree of said exhaust control valve; and valve abnormality detection means for detecting abnormality of operation of said exhaust control valve, and
    said injection amount determination means is comprised so that, when the abnormality of said exhaust control valve is not detected by said valve abnormality detection means, the injection amount determining variable arithmetical operation map selected according to the opening degree of said exhaust control valve detected by said valve opening sensor is used to arithmetically operate said injection amount determining variable, and when the abnormality of said exhaust control valve is detected, of the maps stored in said injection amount determining variable arithmetical operation map storage means, the injection amount determining variable arithmetical operation map in which the injection amount of arithmetically operated fuel is at the maximum is used to arithmetically operate said injection amount determining variable.

4. An electronic control unit for a two-cycle internal combustion engine with an exhaust control valve, comprising:
    an injector for supplying fuel to the internal combustion engine with the exhaust control valve whose opening is changed to adjust exhaust timing;
    injection amount determination means for determining an injection amount determining variable, which determines the injection amount of fuel injected from said injector, for various control conditions;
    injector driving means for driving said injector so as to inject fuel of the injection amount determined by the injection amount determining variable determined by said injection amount determination means;
    ignition timing determination means for determining the ignition timing of said internal combustion engine for various control conditions; and
    ignition device driving means for driving an ignition device which ignites said internal combustion engine and performing igniting operation when the ignition timing determined by said ignition timing determination means is detected,
    wherein said electronic control unit further comprises a valve opening sensor for detecting an opening degree of said exhaust control valve; injection amount determining variable arithmetical operation map storage means which stores a plurality of injection amount determining variable arithmetical operation maps for normal state which are prepared for different values of the opening degree of said exhaust control valve and an injection amount determining variable arithmetical operation map for abnormal state which is used when the operation of said exhaust control map is abnormal;

and valve abnormality detection means for detecting the abnormality of operation of said exhaust control valve, and said injection amount determination means is comprised so that, when the abnormality of said exhaust control valve is not detected by said valve abnormality detection means, the injection amount determining variable arithmetical operation map for the normal state selected according to the opening degree of said exhaust control valve detected by said valve opening sensor is used to arithmetically operate said injection amount determining variable, and when the abnormality of said exhaust control valve is detected, of the maps stored in said injection amount determining variable arithmetical operation map storage means, the injection amount determining variable arithmetical operation map for the abnormal state is used to arithmetically operate said injection amount determining variable.

5. The electronic control unit for a two-cycle internal combustion engine with an exhaust control valve according to claim 4, wherein said injection amount determining variable arithmetical operation map for the abnormal state is comprised so that the injection amount determined by the injection amount determining variable arithmetically operated by using said map is increased to a value higher than the value determined by said control condition at the normal state.

6. The electronic control unit for a two-cycle internal combustion engine with an exhaust control valve according to claim 4, wherein said injection amount determining variable arithmetical operation map for the abnormal state is comprised so that the injection amount determined by the injection amount determining variable arithmetically operated by using said map is increased to a value higher than the value determined by said control condition at the normal state within a range not exceeding the maximum value that said injection amount can take for said control condition at the normal state.

7. An electronic control unit for a two-cycle internal combustion engine with an exhaust control valve, comprising:

an injector for supplying fuel to the internal combustion engine with the exhaust control valve whose opening is changed to adjust exhaust timing;

injection amount determination means for determining an injection amount determining variable, which determines the injection amount of fuel injected from said injector, for various control conditions;

injector driving means for driving said injector so as to inject fuel of the injection amount determined by the injection amount determining variable determined by said injection amount determination means;

ignition timing determination means for determining the ignition timing of said internal combustion engine for various control conditions; and ignition device driving means for driving an ignition device which ignites said internal combustion engine and performing igniting operation when the ignition timing determined by said ignition timing determination means is detected, wherein said electronic control unit further comprises a valve opening sensor for detecting an opening degree of said exhaust control valve; injection amount determining variable arithmetical operation map storage means which stores a plurality of injection amount determining variable arithmetical operation maps prepared for different values of the opening degree of said exhaust control valve; valve abnormality detection means for detecting the abnormality of operation of said exhaust control valve; injection amount determining variable correction data arithmetical operation means for arithmetically operating injection amount determining variable correction data, which is used to correct the injection amount determining variable determined by said injection amount determination means to the increase side when the operation of said exhaust control valve is abnormal, for various control conditions; and injection amount correction means for correcting the injection amount determining variable determined by said injection amount determination means so that said injection amount takes an increased value by using the injection amount determining variable correction data arithmetically operated by said injection amount determining variable correction data arithmetical operation means when the abnormality of said exhaust control valve is detected by said valve abnormality detection means, and said injection amount determination means is comprised so as to arithmetically operate said injection amount determining variable by using the injection amount determining variable arithmetical operation map selected according to the opening degree of said exhaust control valve detected by said valve opening sensor.

8. The electronic control unit for a two-cycle internal combustion engine with an exhaust control valve according to claim 3, 4, 5, 6 or 7, wherein said valve abnormality detection means is comprised so that, when it is detected that the opening degree of said exhaust control valve detected by said valve opening sensor is out of the control range, the abnormality of said exhaust control valve is detected.

9. The electronic control unit for a two-cycle internal combustion engine with an exhaust control valve according to claim 3, 4, 5, 6 or 7, wherein said valve abnormality detection means is comprised so that, when the output of said valve opening sensor does not exhibit an expected change for a driving signal outputted by said exhaust control valve control means to operate said exhaust control valve, the abnormality of said exhaust control valve is detected.

10. The electronic control unit for a two-cycle internal combustion engine with an exhaust control valve according to claim 3, 4, 5, 6 or 7, wherein said valve abnormality detection means is comprised so that, when it is detected that the output of said valve opening sensor is changed in the state in which said exhaust control valve control means does not output a driving signal for operating said exhaust control valve, the abnormality of said exhaust control valve is detected.

11. The electronic control unit for a two-cycle internal combustion engine with an exhaust control valve according to claim 3, 4, 5, 6 or 7, wherein said valve abnormality detection means is comprised so that, when a difference between a desired position of said exhaust control valve intended by said exhaust control valve control means and the position of said exhaust control valve detected by said valve opening sensor is not in an allowable range, the abnormality of the exhaust control valve is detected.

12. The electronic control unit for a two-cycle internal combustion engine with an exhaust control valve according to claim 3, 4, 5, 6 or 7, wherein said valve abnormality detection means is comprised so that, when it is detected that a time change rate of the output of said valve opening sensor does not exceed a judgment value corresponding to a lower limit value of a variation range of a displacement rate at the normal state of said exhaust control valve in the state in which said exhaust control valve control means outputs a driving signal for operating said exhaust control valve, the abnormality of said exhaust control valve is detected.

13. The electronic control unit for a two-cycle internal combustion engine with an exhaust control valve according to claim 3, 4, 5, 6 or 7, wherein said ignition timing determination means is comprised so that, when said valve abnormality detection means detects the abnormality of operation of said exhaust control valve, the ignition timing of said internal combustion engine is delayed with respect to the ignition timing determined for said control condition at the normal state.

14. The electronic control unit for a two-cycle internal combustion engine with an exhaust control valve according to claim 3, 4, 5, 6 or 7, wherein said electronic control unit further comprises ignition timing arithmetical operation map storage means which stores a plurality of ignition timing arithmetical operation maps prepared for different values of the opening degree of said exhaust control valve, and said ignition timing determination means is comprised so that, when the abnormality of said exhaust control valve is not detected by said valve abnormality detection means, the ignition timing arithmetical operation map selected according to the opening degree of said exhaust control valve detected by said valve opening sensor is used to arithmetically operate said ignition timing, and when the abnormality of said exhaust control valve is detected, of the maps stored in said ignition timing arithmetical operation map storage means, the ignition timing arithmetical operation map in which the arithmetically operated ignition timing is delayed most is used to arithmetically operate said ignition timing.

15. The electronic control unit for a two-cycle internal combustion engine with an exhaust control valve according to claim 3, 4, 5, 6 or 7, wherein said electronic control unit further comprises ignition timing arithmetical operation map storage means which stores a plurality of ignition timing arithmetical operation maps for the normal state which are prepared for different values of the opening degree of said exhaust control valve and an ignition timing arithmetical operation map for the abnormal state which is used when the operation of said exhaust control valve is abnormal, and said ignition timing determination means is comprised so that, when the abnormality of said exhaust control valve is not detected by said valve abnormality detection means, the ignition timing arithmetical operation map for the normal state selected according to the opening degree of said exhaust control valve detected by said valve opening sensor is used to arithmetically operate said ignition timing, and when the abnormality of said exhaust control valve is detected, of the maps stored in said ignition timing arithmetical operation map storage means, the ignition timing arithmetical operation map for the abnormal state is used to arithmetically operate said ignition timing.

16. The electronic control unit for a two-cycle internal combustion engine with an exhaust control valve according to claim 3, 4, 5, 6 or 7, wherein said electronic control unit further comprises ignition timing correction data arithmetical operation means for arithmetically operating ignition timing correction data, which is used to correct the ignition timing determined by said ignition timing determination means to the delay side when the operation of said exhaust control valve is abnormal, for various control conditions; and ignition timing correction means for correcting the ignition timing determined by said ignition timing determination means so that said ignition timing is made delayed timing by using the ignition timing correction data arithmetically operated by said ignition timing correction data arithmetical operation means when the abnormality of said exhaust control valve is detected by said valve abnormality detection means.

17. The electronic control unit for a two-cycle internal combustion engine with an exhaust control valve according to claim 1, 3, 4, 5, 6, or 7, wherein said electronic control unit further comprises exhaust control valve control means for controlling the opening degree of said exhaust control valve for various control conditions.

18. An electronic control unit for a two-cycle internal combustion engine with an exhaust control valve, comprising:

a throttle sensor for detecting an opening degree of a throttle valve of the two-cycle internal combustion engine with the exhaust control valve whose opening is changed to adjust exhaust timing;

injection amount determination means for determining an injection amount determining variable so as to obtain an air-fuel mixture with a predetermined air-fuel ratio for the intake air amount to a cylinder of said internal combustion engine estimated from the opening degree of said throttle valve detected by said throttle sensor and from the rotational speed of said internal combustion engine;

injector driving means for driving an injector so as to inject fuel of the injection amount determined by the injection amount determining variable determined by said injection amount determination means;

ignition timing determination means for determining ignition timing of said internal combustion engine for various control conditions;

ignition device driving means for driving an ignition device which ignites said internal combustion engine and performing igniting operation when the ignition timing determined by said ignition timing determination means is detected;

wherein said electronic control unit further comprises valve abnormality detection means for detecting abnormality of the operation of said exhaust control valve when it is detected that the rotational speed of said internal combustion engine is lower than a set value despite the fact that it is detected for more than set time by said throttle sensor that said throttle valve is in a fully-opened state, and said injection amount determination means is comprised so that, when said valve abnormality detection means detects the abnormality of the operation of said exhaust control valve, said injection amount is increased to a value higher than the value determined by said control condition at the normal state.

19. An electronic control unit for a two-cycle internal combustion engine with an exhaust control valve, comprising:
a throttle sensor for detecting an opening degree of a throttle valve of the two-cycle internal combustion engine with the exhaust control valve whose opening is changed to adjust exhaust timing;
injection amount determination means for determining an injection amount determining variable so as to obtain an air-fuel mixture with a predetermined air-fuel ratio for the intake air amount to a cylinder of said internal combustion engine estimated from the opening degree of said throttle valve detected by said throttle sensor and from the rotational speed of said internal combustion engine;
injector driving means for driving an injector so as to inject fuel of the injection amount determined by the injection amount determining variable determined by said injection amount determination means;
ignition timing determination means for determining ignition timing of said internal combustion engine for various control conditions; and
ignition device driving means for driving an ignition device which ignites said internal combustion engine and performing igniting operation when the ignition timing determined by said ignition timing determination means is detected,
wherein said electronic control unit further comprises valve abnormality detection means for detecting abnormality of the operation of said exhaust control valve when it is detected that the rotational speed of said internal combustion engine is lower than a set value despite the fact that it is detected for more than set time by said throttle sensor that said throttle valve is in a fully-opened state, and
said injection amount determination means is comprised so that, when said valve abnormality detection means detects the abnormality of the operation of said exhaust control valve, said injection amount is increased to a value higher than the value determined by said control condition at the normal state within a range not exceeding the maximum value that said injection amount can take for said control condition at the normal state.

20. An electronic control unit for a two-cycle internal combustion engine with an exhaust control valve, comprising:
a throttle sensor for detecting an opening degree of a throttle valve of the two-cycle internal combustion engine with the exhaust control valve whose opening is changed to adjust exhaust timing;
an intake pressure sensor for detecting intake pipe pressure of said internal combustion engine;
an atmospheric pressure sensor for detecting atmospheric pressure;
injection amount determination means for arithmetically operating an injection amount determining variable so as to obtain an air-fuel mixture with a predetermined air-fuel ratio for an intake air amount to a cylinder of said internal combustion engine estimated from the intake pipe pressure detected by said intake pressure sensor, the opening degree of said throttle valve detected by said throttle sensor, and the rotational speed of said internal combustion engine;
injector driving means for driving an injector so as to inject fuel of the injection amount determined by the injection amount determining variable determined by said injection amount determination means;
ignition timing determination means for determining ignition timing of said internal combustion engine for various control conditions; and
ignition device driving means for driving an ignition device which ignites said internal combustion engine and performing igniting operation when the ignition timing determined by said ignition timing determination means is detected,
wherein said electronic control unit further comprises valve abnormality detection means for detecting abnormality of the operation of said exhaust control valve when it is detected that the rotational speed of said internal combustion engine cannot exceed a set value despite the fact that it is detected that a difference between the atmospheric pressure detected by said atmospheric pressure sensor and the intake pipe pressure detected by said intake air sensor is not larger than a set value, and
said injection amount determination means is comprised so that, when said valve abnormality detection means detects the abnormality of the operation of said exhaust control valve, said injection amount is increased to a value higher than the value determined by said control condition at the normal state.

21. An electronic control unit for a two-cycle internal combustion engine with an exhaust control valve, comprising:
a throttle sensor for detecting an opening degree of a throttle valve of the two-cycle internal combustion engine with the exhaust control valve whose opening is changed to adjust exhaust timing;
an intake pressure sensor for detecting intake pipe pressure of said internal combustion engine;
an atmospheric pressure sensor for detecting atmospheric pressure;
injection amount determination means for arithmetically operating an injection amount determining variable so as to obtain an air-fuel mixture with a predetermined air-fuel ratio for an intake air amount to a cylinder of said internal combustion engine estimated from the intake pipe pressure detected by said intake pressure sensor, the opening degree of said throttle valve detected by said throttle sensor, and the rotational speed of said internal combustion engine;
injector driving means for driving an injector so as to inject fuel of the injection amount determined by the injection amount determining variable determined by said injection amount determination means;
ignition timing determination means for determining ignition timing of said internal combustion engine for various control conditions; and
ignition device driving means for driving an ignition device which ignites said internal combustion engine and performing igniting operation when the ignition timing determined by said ignition timing determination means is detected,
wherein said electronic control unit further comprises valve abnormality detection means for detecting abnormality of operation of said exhaust control valve when it is detected that the rotational speed of said internal combustion engine cannot exceed a set value despite the fact that it is detected that a difference between the atmospheric pressure detected by said atmospheric pressure sensor and the intake pipe pressure detected by said intake air sensor is not larger than a set value, and said injection amount determination means is comprised so that, when said valve abnormality detection means detects abnormality of the operation of said exhaust control valve, said injection amount is increased to a value higher than the value determined by said control condition at the normal state within a range not exceeding the maximum value that said injection amount can take for said control condition at the normal state.

22. The electronic control unit for a two-cycle internal combustion engine with an exhaust control valve according to claim 18, 19, 20 or 21,
wherein said electronic control unit further comprises exhaust control valve control means for controlling the opening degree of said exhaust control valve for various control conditions.

23. The electronic control unit for a two-cycle internal combustion engine with an exhaust control valve according to claim 18, 19, 20 or 21,
wherein said ignition timing determination means is comprised so that, when said valve abnormality detection means detects abnormality of the operation of said exhaust control valve, the ignition timing of said internal combustion engine is delayed with respect to the ignition timing determined for said control condition at the normal state.

24. The electronic control unit for a two-cycle internal combustion engine with an exhaust control valve according to claim 18, 19, 20 or 21,
wherein said electronic control unit further comprises ignition timing correction data arithmetical operation means for arithmetically operating ignition timing correction data, which is used to correct the ignition timing determined by said ignition timing determination means to the delay side when the operation of said exhaust control valve is abnormal, for various control conditions; and
ignition timing correction means for correcting the ignition timing determined by said ignition timing determination means so that said ignition timing is made delayed timing by using the ignition timing correction data arithmetically operated by said ignition timing correction data arithmetical operation means when the abnormality of said exhaust control valve is detected by said valve abnormality detection means.

25. The electronic control unit for a two-cycle internal combustion engine with an exhaust control valve according to claim 18, 19, 20 or 21,
wherein said electronic control unit further comprises ignition timing arithmetical operation map storage means which stores a plurality of ignition timing arithmetical operation maps for the normal state which are prepared for different values of the opening degree of said exhaust control valve and an ignition timing arithmetical operation map for the abnormal state which is used when the operation of said exhaust control valve is abnormal, and
said ignition timing determination means is comprised so that, when the abnormality of said exhaust control valve is not detected by said valve abnormality detection means, the ignition timing arithmetical operation map for the normal state selected according to the opening degree of said exhaust control valve detected by said valve opening sensor is used to arithmetically operate said ignition timing, and when the abnormality of said exhaust control valve is detected, of the maps stored in said ignition timing arithmetical operation map storage means, the ignition timing arithmetical operation map for the abnormal state is used to arithmetically operate said ignition timing.

* * * * *